Sept. 14, 1954     R. E. SNYDER     2,688,984
HYDROPNEUMATIC ACCUMULATOR
Filed Feb. 20, 1950     2 Sheets-Sheet 1
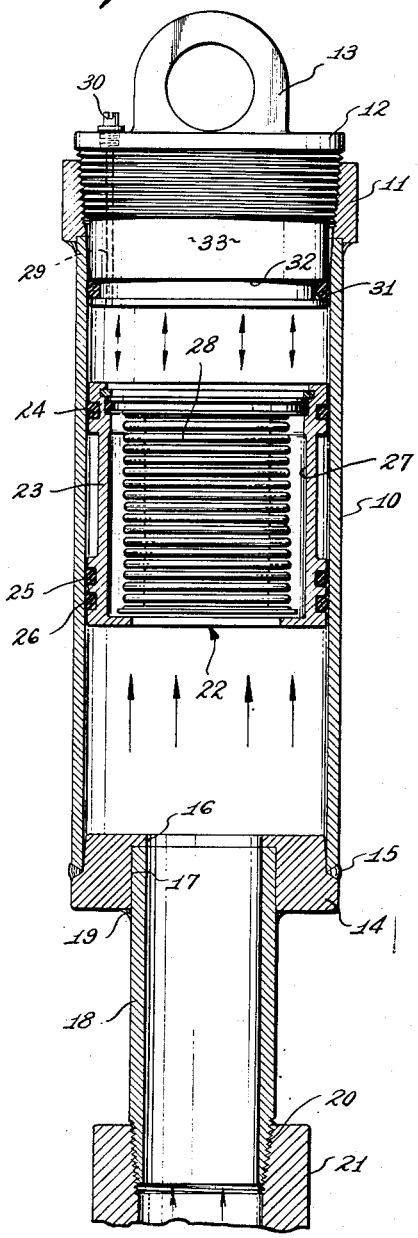
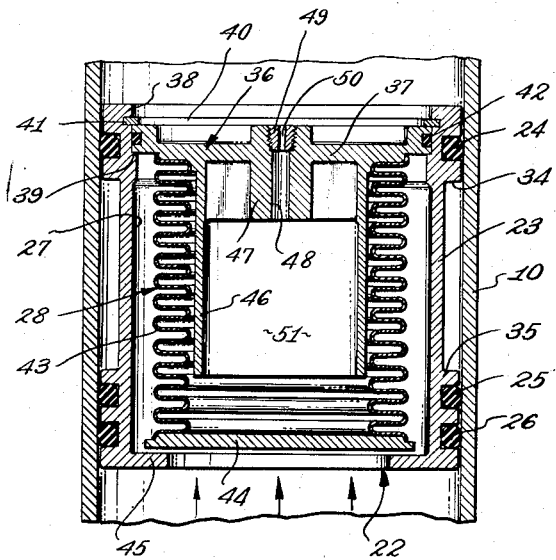
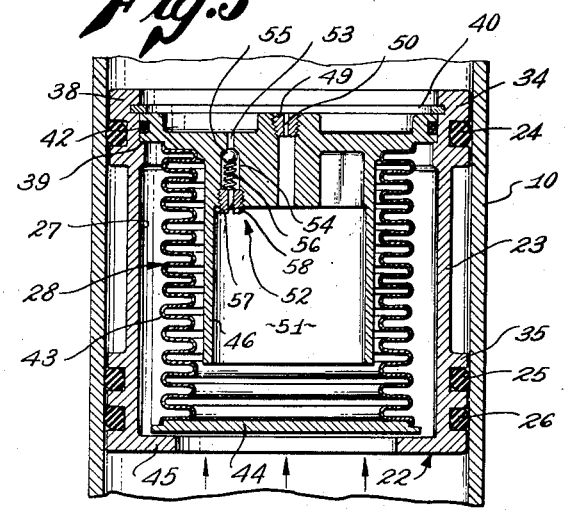
INVENTOR.
ROBERT E. SNYDER
BY Fulwider & Mattingly
Attorneys Sept. 14, 1954   R. E. SNYDER   2,688,984
HYDROPNEUMATIC ACCUMULATOR
Filed Feb. 20, 1950   2 Sheets-Sheet 2
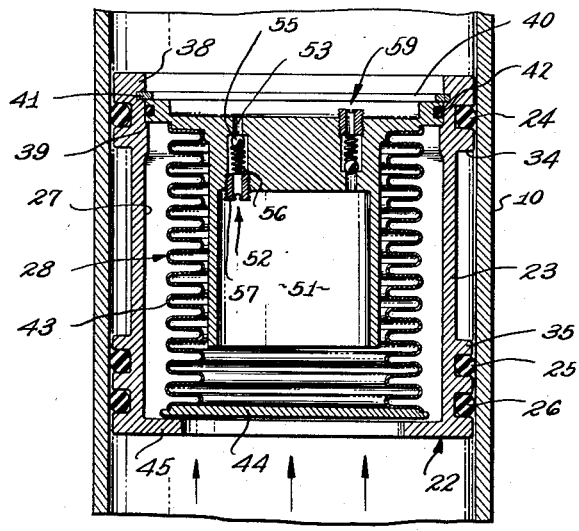
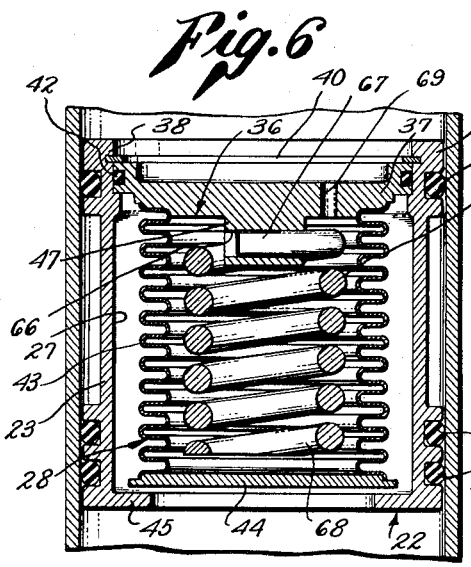
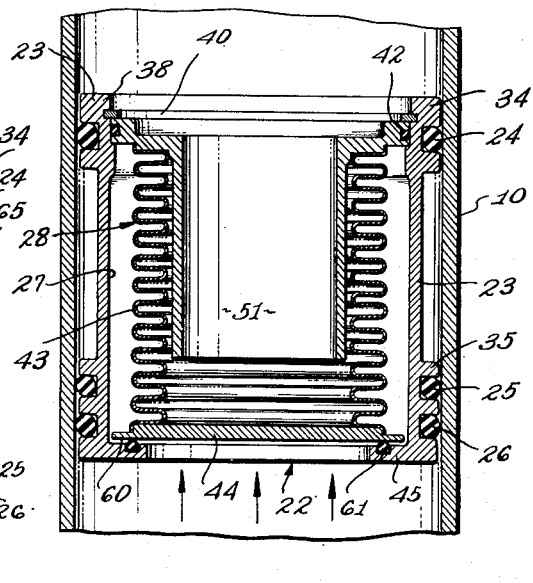
INVENTOR.
ROBERT E. SNYDER
BY Fulwider & Mattingly
Attorneys Patented Sept. 14, 1954

2,688,984

UNITED STATES PATENT OFFICE 2,688,984

HYDROPNEUMATIC ACCUMULATOR

Robert E. Snyder, Pasadena, Calif., assignor to Snyder Oil Tool Corporation, Los Angeles, Calif., a corporation of California Application February 20, 1950, Serial No. 145,180

14 Claims. (Cl. 138—31)

This invention relates to hydropneumatic accumulators, and has particular reference to an improved accumulator of the piston-diaphragm type.

In my copending application, Serial No. 710,490, filed November 18, 1946, and entitled Accumulator, Patent No. 2,663,320, there is illustrated and described a hydropneumatic accumulator comprising an elongated cylinder closed at its upper end and having reciprocally fitted therein a movable piston. The space below the piston is connected to the fluid conduit in which pressure variations are to be minimized and the portion of the cylinder above the piston is charged with gas or air under pressure. In the mentioned copending application, the piston is fitted with a flexible diaphragm so that relatively small or rapid changes in pressure may be accommodated by the flexing of the diaphragm without requiring the piston to move within its cylinder, whereas large and sustained variations are accommodated by bodily movement of the entire diaphragm and piston assembly.

The construction disclosed in the aforementioned copending application, while greatly minimizing the shocks in fluid distribution systems resulting from most of the pressure changes encountered, fails to completely eliminate these shocks under certain conditions of operation. Difficulty is encountered, for example, in the case of large, sudden and sustained pressure changes. If the diaphragm is made of extreme flexibility and accordingly has a low spring rate as is required to minimize small, fast and short-time pressure changes, the diaphragm does not develop enough force by reason of its deflection to overcome the friction and inertia of the piston. As a result, the very flexible diaphragm is driven violently into engagement with the stops which are provided to prevent rupture of the diaphragm with a resultant shock being transmitted to the fluid distribution system by reason of the ensuing abrupt pressure rise during acceleration of the piston. If, on the other hand, the diaphragm is made of relatively stiff material or is otherwise caused to have a large spring rate so as to develop enough force upon limited deflection to overcome the friction and inertia of the piston before the diaphragm engages the stop, a portion of the problem is solved, but the diaphragm may then be limited in the flexibility required to eliminate the small, fast short-time changes in pressure.

The major object of this invention then lies in the provision of a diaphragm structure which, although sufficiently flexible to eliminate small, fast, short-time changes in pressure, will nevertheless transfer a substantial portion of its load to the piston when exposed to larger pressure changes and thereby start the piston into motion prior to the contact of the diaphragm with either end stop. This is accomplished by using a diaphragm having an inherent resilience or a specially provided resilient means which develops enough force between the diaphragm and the piston to overcome both the piston friction with the cylinder wall and the piston inertia prior to the diaphragm engaging the stops. This structure avoids the difficulties encountered when a very light diaphragm is used.

The major object may also be attained by providing means for increasing the apparent stiffness of a thin diaphragm by trapping a portion of the gas between the thin diaphragm and the piston so that the initial pressure rise will first compress the gas so trapped and thereby transfer a force to the piston and cause it to move prior to contact of the diaphragm with the end stop. Different porting means are employed to balance out the pressure within the diaphragm and that in the main gas chamber above the piston, but at a relatively slower rate.

It should be further noted that instead of gas trapped within the light diaphragm, resilient means such as helical springs may be used as diaphragm stops to transfer force from the diaphragm to the piston. This form permits a limited free travel of a light diaphragm before the additional stiffness is applied.

It is also an object of this invention to provide an improved diaphragm piston for use in piston type hydropneumatic accumulators to overcome the above-mentioned disadvantages by employing a highly flexible diaphragm in combination with a damping means for gradually increasing the apparent stiffness of the diaphragm as a function of the rate of flexing thereof.

It is another object of this invention to provide a diaphragm piston of the character set forth in the preceding paragraphs in which said damping means exhibits a different characteristic for pressure increases than for decreases in pressure.

It is an additional object of this invention to provide an improved diaphragm piston of the character hereinbefore described in which said damping means exhibits different damping factors for different operating conditions.

It is a still further object of this invention to provide a piston for use in piston type hydropneumatic accumulators, including a flexible diaphragm which encloses within a hollow piston an auxiliary gas chamber and which includes one or more restricted passages communicating said chamber with the upper or gas chamber side of said piston.

It is also an object of this invention to provide a construction of the character described in the preceding paragraphs which includes a check valve in at least one of said passages.

It is another object of this invention to provide a construction of the character hereinbefore described which employs two restricted passages with a check valve in each, said check valve being oppositely directed to open alternately upon increases and decreases in pressure.

It is also an object of this invention to provide a piston construction for piston type hydropneumatic accumulators in which the piston and diaphragm are so arranged as to define therebetween a liquid receiving space together with a restricted passage communicating said space with the underside of said piston.

Other objects and advantages of this invention will be apparent from a consideration of the following specification, read in connection with the accompanying drawings, wherein:

Fig. 1 is a longitudinal sectional view through a hydropneumatic accumulator of the piston-diaphragm type illustrating the general construction and operation of the accumulator;

Fig. 2 is a fragmentary sectional view illustrating the construction of an improved diaphragm type piston for use with the accumulator shown in Fig. 1; and Figs. 3, 4, 5, and 6 are each similar to Fig. 2 and each illustrates a different form the invention may take.

Referring to the drawings, there is illustrated in Fig. 1 the construction of a hydropneumatic accumulator of the diaphragm-piston type, such as is disclosed in the aforementioned copending application, Serial No. 710,490. The accumulator comprises a cylinder 10 fitted at its upper end with a collar 11, which is internally threaded to receive a correspondingly threaded upper closure member 12. For convenience the upper closure member 12 may have formed integrally therewith a lifting eye 13. The lower end of the cylinder 10 is fitted with a fluid coupling comprising a lower closure 14, suitably secured to the cylinder 10 as by welding 15, bored and counterbored as shown at 16 and 17 to receive one end of a pipe nipple 18, the nipple 18 being hermetically sealed and secured to the closure 14 as by welding 19.

The lower end of the nipple 18 is preferably threaded as shown at 20 to permit attachment to a coupling or collar 21, which is understood to form a part of the fluid distribution system with which the accumulator is to be used.

Within the cylinder 10 there is slidably mounted a diaphragm type piston assembly indicated generally by the reference character 22. The piston assembly 22 comprises a cylindrical sleeve-like piston 23 which is fitted as shown at 24, 25, and 26, with O-ring seals to prevent fluid leakage past the piston. Within the inner bore 27 of the sleevelike piston 23, there is mounted a diaphragm 28 which may take the form of an extensible metal bellows. As will be described in more detail hereinafter, the bellows 28 extends, in effect, across the inner bore 27 and forms a diaphragm isolating the portion of the cylinder below the piston from the portion of the cylinder above the piston.

The space within the cylinder 10 above the piston is preferably filled with air or an inert gas to a predetermined pressure which depends upon the operating conditions. To this end, the upper closure 12 is provided with a charging passage 29 and a suitable fitting 30 to permit the gas under pressure to be injected into the space above the piston assembly 22. Fluid leakage past the threads securing the closure 12 to the collar 11 may be prevented by means of an O-ring seal 31 carried in a suitable annular groove 32 formed in an extension portion 33 of the closure 12.

It will be understood that the interior space within the cylinder 10 below the piston assembly 22 is filled with the liquid contained in the fluid distribution system to which the accumulator is connected, and that pressure variations in said fluid distribution system are transmitted directly to the interior of the cylinder 10 by the fluid connection comprising nipple 18 and coupling 21.

It will be seen that should the pressure in the fluid distribution system increase slowly and substantially, the increased pressure on the underside of the piston assembly 22 will cause the same to travel upwardly within the cylinder 10. This upward movement of the piston assembly 22 compresses the gas in the upper part of the cylinder with a corresponding increase in the pressure of the gas. When the pressure of the gas rises to equality with the pressure exerted on the underside of the piston 22 by the liquid in the fluid distribution system, the piston 22 will come to rest. It will also be seen that minor and rapid fluctuations in pressure will result in flexing the diaphragm 28, and if the magnitude of these pressure variations is sufficiently small, the entire compensation will result from the flexing of the diaphragm 28 and will not be accompanied by a movement of the piston 22 within the cylinder 10.

In order to completely understand the operation of the improved constructions to be described hereinafter, it will be necessary to understand the nature of the pressure changes which may be encountered in the operation of the device. These pressure changes fall into three general classes which, for convenience, are herein defined as "surges," "hydraulic vibration," and "shock waves." The surges are pressure changes which are accompanied and transmitted by an actual flow of liquid in the system. Shock waves, on the other hand, are fast and nearly instantaneous changes in pressure which are propagated through the liquid after the fashion of sound waves, being transmitted by elastic deformation of the liquid but not causing any elastic deformation of the conduit. In hydraulic vibration, the pressure changes are very fast, but the propagation of the waves through the system is accompanied by elastic deformation of the conduit. More complex pressure changes may result from the concurrence of two or more of these types of pressure changes. For example, a surge may follow a shock wave so that in addition to the shock wave, there may be a shift in average pressure to a new value, which new value may be maintained for an appreciable period of time.

Surges in a fluid distribution system give rise to great difficulties, and if through unfortunate circumstance a resonant condition is achieved, permitting the surge magnitude to continually build up, a dangerous situation of sustained oscillations may result. However, the requirements of a hydropneumatic accumulator to compensate for slow surges are not stringent. The diaphragm, for example, may be relatively stiff, and if the rate of pressure change is relatively slow, the surge may be adequately compensated by the physical movement of the piston assembly 22 within its cylinder 10. In this case, the diaphragm may be made relatively flexible without introducing any serious shocks. The diaphragm, if very flexible, will probably be brought into engagement with its stops before sufficient force is applied to the piston to start the same traveling within its cylinder 10, but the velocity with which the diaphragm approaches the stop is so low that no shocks are produced by the resulting engagement therewith The most difficult problems are encountered in the compensation of shock waves and sudden surges of fluid, such as surges preceded by a shock wave, and in compensating hydraulic vibration. Pressure changes of this type produce extreme damage in the distribution system and particularly in the valves and other types of control equipment forming a part of such systems. They also impose serious restrictions upon the permissible characteristics of the diaphragm 28. It will be appreciated that shock waves can be most efficiently absorbed by a diaphragm of low inertia and low spring rate, so that the diaphragm may respond very quickly to the pressure change applied by the shock wave front. If the shock wave is of reasonable magnitude, no particular problem is encountered since the diaphragm moves with the shock wave and assumes its original position upon the restoration of the pressure value to the initial condition. If, however, the shock wave is accompanied by a rapid surge so that the steady state pressure following the shock wave and surge front is materially different from the initial pressure, it is necessary to provide a diaphragm characteristic such that the shock wave is compensated but capable also of exerting a sufficient force upon the piston assembly 22 to overcome the inertia and friction of the assembly and start it moving to a new location in the cylinder 10 corresponding to the new and sustained pressure conditions. It is to the provision of a structure having these operating characteristics that the present invention is directed.

Referring now to Fig. 2, there is illustrated therein the construction of a diaphragm type of piston assembly 22 having the desirable characteristics above mentioned. As is shown in Fig. 2, the piston assembly 22 comprises the aforementioned tubular piston 23 provided with the O-ring seals 24, 25, and 26 hereinbefore mentioned, these seals being retained in annular grooves formed in upper and lower thickened portions 34 and 35 of the piston 23.

The diaphragm assembly, which is indicated generally by the reference character 28, is carried by a piston closure member 36 which includes a disklike portion or plate 37 extending completely across and closing the bore 27 through the tubular piston element 23. The closure 36 is received within a counterbore 38 formed in the upper portion of the bore 27 and rests upon a radial shoulder 39 formed in said bore  The closure 36 may be retained in the position shown in Fig. 2 by means of a spring snap ring 40, removably received within an annular groove 41. A fluid seal between the closure 36 and the tubular piston structure 23 is provided by an O-ring seal 42.

The flexible diaphragm proper preferably comprises a pressure-expansible element 43 in the form of a metal bellows of the type commonly referred to as a Sylphon. The upper and normally open end of the bellows 43 is preferably secured and sealed against the underside of the plate 37 as by soldering or welding. The lower open end of the bellows 43 is closed by means of a lower closure member 44 which is similarly sealed and secured to the lower end of the bellows 43 as by soldering or welding.

A lower stop for limiting the downward movement of the closure 44 is provided by an in-turned flange 45, preferably formed integrally with the piston structure 23 and underlying the closure 24. Similarly, an upper stop in the form of a skirt 46 situated inside of the bellows 43 and depending from the plate 37 serves to limit upward movement of the closure 44.

The central portion of the closure member 36 is thickened to provide a central boss 47 through which is bored a gas passage 48. The upper end of the passage 48 is threaded to receive a threaded orifice plug 49 having formed therein a small diameter orifice 50 communicating the bore 48 with the interior of the cylinder 10 above the piston 22. It will be appreciated that the size of the orifice 50 may be changed as desired by replacing the plug 49 with a similar plug having an orifice 50 of a different size formed therein depending upon the required rate of flow of gas therethrough.

The upper piston closure member 36, the bellows 43 and the lower closure 44 define within the interior of the bellows 43 a gas chamber which is in communication with the upper side of the piston assembly 22 by reason of the passage 48 and orifice 50. The volume of this gas chamber is variable depending upon the position of the lower closure 44 relative to the piston 23

When the pressure in the liquid below the piston assembly 22 is increased slowly, the lower closure 44 will move slowly upwards and will displace gas from the gas chamber 51 through the orifice 50. The upward movement of the closure 44 relative to the piston 23 will be arrested either by the engagement of the member 44 with the upper stop 46, or by reason of the upward force exerted on the piston through the bellows 43 exceeding the force required to overcome the friction forces tending to hold the piston 23 in a fixed position within the cylinder 10.

On the other hand, if the pressure rise is of the shock wave rapid surge type, the substantially instantaneous increase in pressure will tend to move the lower closure 44 upward with great rapidity. This tends to compress the gas within the chamber 51 since a rapid flow of gas from the chamber is prevented by the restricted character of the orifice 50. There is, accordingly, applied directly to the outer piston structure 23 a much larger upward force than in the previously described case where the movement of the closure 44 was relatively slow. This larger force applied to the outer piston 23 is sufficient to overcome the inertia and friction forces and so start the piston moving upwardly within the cylinder 10. This relieves the pressure condition below the piston and prevents the closure member 44 from striking the upper stop 46 at a high velocity and so eliminates the secondary shock wave which would result from such an impact.

It will be seen that the orifice 50 functions to cause the upward force exerted by the bellows 43 on the outer piston structure 23 to increase as the rate of movement of the lower closure 44 increases. The amount of such increase in force depends upon the ratio of the maximum and minimum volumes of the gas chamber 51 and upon the diameter of the orifice 50. The orifice diameter 50 may be selected at will as previously described to provide for specific average conditions in any given hydraulic system. The ratio of the volumes of the gas chamber 51 may be adjusted during manufacture by varying the size of the gas chamber within the diaphragm, the thickness of the plate 37, the diameter of the boss 47, and the distance between the stops 45 and 46.

There is shown in Fig. 3 a modified form of the invention which is similar in many respects to that shown in Fig. 2, identical parts being identified in Fig. 3 by the same reference characters as are used in Fig. 2. The principal difference between the two structures resides in a check valve indicated generally by the reference character 52 in Fig. 3. This check valve may comprise a passage 53 which is bored through the upper closure 36 and which is enlarged in its lower portion as indicated at 54 to provide a valve seat for receiving a ball check valve member 55. The ball valve member 55 is urged upwardly and into engagement with its seat by a compression spring 56 interposed between the ball 55 and a spring retainer 57 threadedly secured in the bore 54. The retainer 57 is bored as shown at 58 to provide a gas passage through the bores 58 and 54, past the valve 55 when in its open position, and through the bore 53 to the upper side of the piston assembly 22.

The form of the invention shown in Fig. 3 operates in a manner similar to that described in connection with Fig. 2. If the change in pressure of the liquid on the underside of the piston assembly 22 is in an increasing direction, the device functions in exactly the same manner as does the device shown in Fig. 2. If, however, the change in pressure is in a decreasing direction, the downward movement of the lower closure 44 will tend to produce a reduced pressure within the gas chamber 51. If, because of the rapidity of the pressure change of the shock and/or wave, the pressure within the chamber 51 falls below that required to open the check valve 52, the ensuing opening of the valve provides for supplying gas to the chamber 51 at a more rapid rate than is possible solely through the orifice 50. This tends to limit to a desirable and suitable value the magnitude of the forces which are applied to the outer piston structure 23 by reason of the downward movement of the lower closure 44.

The modification of the invention which is shown in Fig. 4 differs from that shown in Fig. 3 by the substitution of a second check valve 59 for the passage 48 and orifice 50 of the structure of Fig. 3. The structure shown in Fig. 4 thus includes two check valves 52 and 59, providing valved passages leading from the gas chamber 51 to the upper side of the piston assembly 22. The valves 52 and 59 are in opposing directions so that the valve 52 will be opened by a reduction in pressure within the gas chamber 51 as heretofore described, whereas the valve 59 will be opened by an increase in the gas pressure. The magnitude of any pressure variation required to cause the valves to open is predetermined by the strength of the spring normally holding each valve closed. The valve 52 thus serves to control and determine the amount of damping and apparent stiffness of the diaphragm assembly upon decreases in liquid pressure below the piston 22, while the check valve 59 is the controlling element in the case of increases of pressure.

At the start of a changing condition, the gas chamber 51 is closed off from the gas space above the piston 22. When the pressure within the chamber 51 changes to a value sufficient to cause the opening of one of the valves, the device functions from then on as an orifice damping means, the actuating pressure being determined by the spring and the rate at which gas is transferred between the chamber 51 and the space above the piston assembly 22 depending upon the diameter of the orifice passage through the spring retainer. It will be appreciated that by adjusting the stiffness of the valve springs it is possible to adjust at will the amount of movement which the lower closure 44 must make before the valve will open. Similarly, an appropriate selection of the orifice size through the spring retainers serves to determine the resistance to transfer of gas between the gas chamber and the space above the piston.

During the time the check valves are closed the diaphragm assembly 28 exhibits a maximum stiffness. When the valves are opened the apparent stiffness is reduced but is damped by the friction opposing the flow of gas through the orifices. It has been found that appropriate adjustment of the variable factors above-mentioned permits the piston assembly to be so adjusted as to adequately compensate for shock waves of considerable magnitude. The forces exerted upon the outer piston assembly by the diaphragm assembly may be made sufficient to start the piston moving within the cylinder 10. Furthermore, the bleeder orifices and valves permit the device to assume a new and balanced condition when the new operating conditions are stabilized in the fluid distribution system to which the accumulator is connected.

In the form of the invention shown in Fig. 5, the damping of the diaphragm assembly 28 is obtained on the liquid side of the assembly. The plate portion 37 of the piston closure member 36 is omitted so as to leave the entire interior of the bellows 28 exposed to the gas pressure existing above the piston assembly 22. The lower bellows closure member 44 differs, however, from that used in the previously described modifications of the invention by including a radial flange portion 60 having an outside diameter only slightly less than the inside diameter of the bore 27 through the tubular piston 23. The space between the piston 23 and the outer surface of the bellows 43 is filled with the same liquid as fills the space in the cylinder 10 below the piston assembly so that movement of the closure 44 relative to the piston structure 23 is of necessity accompanied by a displacement of some of the liquid around the outer edge of the flange 60. Since this flange closely approaches the inner wall of the bore 27, there is provided considerable damping tending to oppose relative motion between the closure 44 and the body of the piston 23. This damping provides the extra force on the outer piston assembly 23 necessary to start the piston moving within the cylinder 10.

Preferably, the lower stop flanges 45 are provided on their upper surface with an annular groove for receiving an O-ring sealing member 61, adapted to be engaged by the lower closure 44 in its lowermost position. This seal operates to prevent explosion of the bellows 44 in the event the pressure below the piston 22 drops abruptly and by a great amount sufficient to bring the closure 44 into engagement with the sealing ring 61.

In the form of the invention which is illustrated in Fig. 6, the upper rigid stop 46 is replaced by a resilient stop which may take the form of a relatively stiff helical compression spring 65. The spring is preferably placed within the bellows 43 and disposed between the lower closure 44 and the upper closure 36. For example, the depending boss 47 forming a part of the upper closure 36 may be provided with a transverse bore 66 into which is turned one end 67 of the compression spring 65. The spring 65 may have a relatively large diameter, and is ground flat at the lower end as is shown at 68 to define an annular plane surface parallel to the upper surface of the lower closure member 44. The length of the spring 65 is selected to space the lower end 68 thereof from the closure member 44 a distance somewhat less than the space usually provided between the closure 44 and the lower end of the sleeve 46.

For relatively small displacements of the bellows 43, which are not sufficient to cause the closure 44 to engage either the lower stop 45 or the stop surface 68 of the spring 65, the only force opposing such displacement is the spring rate of the bellows, it being understood that the interior space enclosed within the bellows 43 is in communication with the gas chamber above the piston through a plurality of relatively large passages 69 formed in the disk portion 37 of the upper closure member. However, should the pressure changes be of sufficient magnitude or of sufficient duration to move the lower closure 44 into engagement with the spring stop surface 68, further upward movement of the lower closure 44 will be resisted by the compressive stress developed in the spring 65, and this resisting force will increase as the lower closure 44 is displaced farther from its normal position.

Preferably, the turns of the spring 65 are closely spaced so as to be brought into contact with each other before the bellows 43 is compressed beyond its elastic limit. When the spring is compressed sufficiently to bring adjacent turns into abutting relation, the spring forms a rigid stop similar to the skirt 46 shown in previously described modifications.

During the movement of the lower closure 44 up to the point of engagement with the underside of the spring 65, the force exerted on the piston 23 will ordinarily not be sufficient to start the piston moving within its cylinder. This relatively free motion of the bellows 43 permits compensation of small magnitude shocks and like rapid pressure changes. Sustained pressure changes such as accompany a surge will deflect the bellows 43 sufficiently to engage the lower closure member 44 with the stop surface 68 to thereafter compress the spring 65 as described. The additional force developed by the spring 65 is applied to the piston 23, and serves to start the piston moving within its cylinder.

It will be observed that common to all of the modifications of the invention described herein is the feature of providing a relatively flexible diaphragm operating in combination with a damping means which functions to impart to the diaphragm an apparent and effective stiffness greatly exceeding the actual spring constant of the diaphragm under conditions wherein the pressure variations are large and extremely rapid. It will be appreciated that in all forms of the invention the magnitude of the forces developed by the damping means is adjustable to meet specific operating conditions, and that these forces are added to the force developed by the spring nature of the bellows so as to apply to the piston assembly sufficient force to start the piston moving within the cylinder even though the force developed by the spring constant of the bellows would not alone be sufficient within the allowable time limit to overcome the friction and inertia forces tending to hold the piston assembly stationary.

By means of the structure hereinbefore described, it is possible to construct a hydropneumatic accumulator of the diaphragm-piston type having characteristics which permit it to compensate adequately for pressure variations within a liquid distribution system, and substantially independently of whether those pressure variations are of the surge type or of the shock wave type, or any combination of the two.

While the various preferred forms of the invention have been described and illustrated herein, the invention is not to be limited to the details of construction shown and described except as defined in the appended claims.

I claim:

1. In a hydropneumatic accumulator having a cylinder, a piston reciprocal therein and dividing said cylinder into a closed upper portion containing gas under pressure and a lower portion to be connected to a fluid distribution system, said piston assembly comprising: a tubular piston body reciprocally received in said cylinder and having a bore extending axially therethrough; an impervious flexible diaphragm extending across said bore for hermetically sealing said bore; and damping means interposed between said diaphragm and said piston body resiliently and selectively transferring force from said diaphragm to said piston and thereby resisting large amplitude rapid movements of said diaphragm relative to said piston body.

2. In a hydropneumatic accumulator having a cylinder, a piston reciprocal therein and dividing said cylinder into a closed upper portion containing gas under pressure and a lower portion to be connected to a fluid distribution system, said piston assembly comprising: a tubular piston body reciprocally received in said cylinder and having a bore extending axially therethrough; an impervious flexible diaphragm extending across said bore for hermetically sealing said bore; and damping means interposed between said diaphragm and said piston body resiliently selectively transferring force from said diaphragm to said piston and thereby resisting large amplitude rapid movements of said diaphragm relative to said piston body, said damping means having one damping factor for movement of said diaphragm in one direction and a different damping factor for movement in the opposite direction.

3. In a hydropneumatic accumulator having a cylinder, a piston reciprocal therein and dividing said cylinder into a closed upper portion containing gas under pressure and a lower portion to be connected to a fluid distribution system, said piston assembly comprising: a tubular piston body reciprocally received in said cylinder and having a bore extending axially therethrough; an impervious flexible diaphragm extending across said bore for hermetically sealing said bore; a first damping means imposed between said diaphragm and said piston body resiliently selectively transferring force from said diaphragm to said piston and thereby resisting large amplitude rapid movements of said diaphragm in one direction relative to said piston body; and a second damping means also interposed between said diaphragm and said piston body for resiliently resisting said relative movements in the opposite direction.

4. In a hydropneumatic accumulator having a cylinder, a piston reciprocal therein and dividing said cylinder into a closed upper portion containing gas under pressure and a lower portion to be connected to a fluid distribution system, said piston assembly comprising: a tubular piston body reciprocally received in said cylinder and having a bore extending axially therethrough; an impervious flexible diaphragm extending across said bore for hermetically sealing said bore; and a rigid upper piston closure member extending across said bore and defining between said member and said diaphragm a gas chamber, said member having a restricted passage therethrough for communicating said chamber with said upper cylinder portion.

5. In a hydropneumatic accumulator having a cylinder, a piston reciprocal therein and dividing said cylinder into a closed upper portion containing gas under pressure and a lower portion to be connected to a fluid distribution system, said piston assembly comprising: a tubular piston body reciprocally received in said cylinder and having a bore extending axially therethrough; an impervious flexible diaphragm extending across said bore for hermetically sealing said bore; a rigid upper piston closure member extending across said bore and defining between said member and said diaphragm a gas chamber, said member having a passage therethrough for communicating said chamber with said upper cylinder portion; and a check valve in said passage.

6. In a hydropneumatic accumulator having a cylinder, a piston reciprocal therein and dividing said cylinder into a closed upper portion containing gas under pressure and a lower portion to be connected to a fluid distribution system, said piston assembly comprising: a tubular piston body reciprocally received in said cylinder and having a bore extending axially therethrough; an impervious flexible diaphragm extending across said bore for hermetically sealing said bore; a rigid upper closure member extending across said bore and defining between said member and said diaphragm a gas chamber, said member having a pair of passages therethrough for communicating said chamber with said upper cylinder portion; orifice means restricting one of said passages; and a check valve in the other of said passages.

7. In a hydropneumatic accumulator having a cylinder, a piston reciprocal therein and dividing said cylinder into a closed upper portion containing gas under pressure and a lower portion to be connected to a fluid distribution system, said piston assembly comprising: a tubular piston body reciprocally received in said cylinder and having a bore extending axially therethrough; an impervious flexible diaphragm extending across said bore for hermetically sealing said bore; a rigid upper piston closure member extending across said bore and defining between said member and said diaphragm a gas chamber, said member having a pair of passages therethrough for communicating said chamber with said upper cylinder portion; and a check valve in each of said passages, said check valves being oppositely directed so as to be opened alternately.

8. In a hydropneumatic accumulator having a cylinder, a piston reciprocal therein and dividing said cylinder into a closed upper portion containing gas under pressure and a lower portion to be connected to a fluid distribution system, said piston assembly comprising: a tubular piston body reciprocally received in said cylinder and having a bore extending axially therethrough; an impervious flexible diaphragm extending across said bore for hermetically sealing said bore; means on said diaphragm and movable therewith defining between said diaphragm and said piston body a liquid receiving space; and means defining a restricted passage for communicating said space with said lower cylinder portion.

9. In a hydropneumatic accumulator having a cylinder, a piston reciprocal therein and dividing said cylinder into a closed upper portion containing gas under pressure and a lower portion to be connected to a fluid distribution system, said piston assembly comprising: a tubular piston body reciprocally received in said cylinder and having a bore extending axially therethrough; an extensible impervious bellows of generally cylindrical form in said bore; a lower closure member extending across and hermetically closing the lower end of said bellows; and an upper closure member secured to said piston body extending across and secured to the upper end of said bellows for supporting said bellows on said piston body and hermetically closing the upper end of said bellows, said upper and lower closure members and bellows defining within said bellows a gas chamber, said upper closure member having a restricted passage therethrough for communicating said chamber with said upper cylinder portion.

10. In a hydropneumatic accumulator having a cylinder, a piston reciprocal therein and dividing said cylinder into a closed upper portion containing gas under pressure and a lower portion to be connected to a fluid distribution system, said piston assembly comprising: a tubular piston body reciprocally received in said cylinder and having a bore extending axially therethrough; an extensible impervious bellows of generally cylindrical form in said bore; a lower closure member extending across and hermetically closing the lower end of said bellows; an upper closure member secured to said piston body extending across and secured to the upper end of said bellows for supporting said bellows on said piston body and hermetically closing the upper end of said bellows, said upper and lower closure members and bellows defining within said bellows a gas chamber, said upper closure member having a pair of passages therethrough for communicating said chamber with said upper cylinder portion; and a check valve in each of said passages, said check valves being oppositely directed so as to be opened alternately.

11. In a hydropneumatic accumulator having a cylinder, a piston reciprocal therein and dividing said cylinder into a closed upper portion containing gas under pressure and a lower portion to be connected to a fluid distribution system, said piston assembly comprising: a tubular piston body reciprocally received in said cylinder and having a bore extending axially therethrough; an impervious flexible diaphragm extending across said bore for hermetically sealing said bore, said diaphragm having an inherent resilience characterized by a given spring rate producing a resisting force opposing forces tending to deflect said diaphragm; and auxiliary means coacting with said diaphragm and distorting said spring rate to provide a non-linear relation between the deflection of said diaphragm and the opposing force resulting therefrom.

12. In a hydropneumatic accumulator having a cylinder, a piston reciprocal therein and dividing said cylinder into a closed upper portion containing gas under pressure and a lower portion to be connected to a fluid distribution system, said piston assembly comprising: a tubular piston body reciprocally received in said cylinder and having a bore extending axially therethrough; an impervious flexible diaphragm extending across said bore for hermetically sealing said bore; and spring means carried by said piston in a position to be engaged by said diaphragm following a given displacement thereof to thereby resiliently resist further displacement of said diaphragm.

13. A hydropneumatic accumulator comprising a cylindrical vessel, a piston slidably mounted in said vessel dividing said vessel into two dependently variable chambers, said piston having a bore extending axially therethrough from one of said chambers to the other, a port in one end of said vessel for receiving gas under pressure, a port in the other end of said vessel for connection to a hydraulic system, a flexible diaphragm in said piston extending across said bore and sealing said bore, and damping means interposed between said diaphragm and said piston selectively transferring force from said diaphragm to said piston and thereby resisting large amplitude rapid movements of said diaphragm relative to said piston.

14. A hydropneumatic accumulator comprising a cylindrical vessel, a piston slidably mounted in said vessel dividing said vessel into two dependently variable chambers, said piston having a bore extending axially therethrough from one of said chambers to the other, a port in one end of said vessel for receiving gas under pressure, a port in the other end of said vessel for connection to a hydraulic system, an extensible impervious bellows of generally cylindrical form in said bore, a lower closure member extending across and hermetically closing the lower end of said bellows, an upper support member secured to said piston and the upper end of said bellows for supporting said bellows in said piston and coacting with said bellows and said lower closure member to hermetically seal said chambers from one another, and damping means interposed between said bellows and said piston for resisting large amplitude rapid movements of said bellows relative to said piston.

References Cited in the file of this patent

UNITED STATES PATENTS

| Number | Name | Date |
|---|---|---|
| 1,932,666 | Hyatt | Oct. 31, 1933 |
| 2,341,556 | Joy | Feb. 15, 1944 |
| 2,365,994 | Ashton | Dec. 26, 1944 |
| 2,411,315 | Ashton | Nov. 19, 1946 |
| 2,417,256 | Kremiller | Mar. 11, 1947 |
| 2,440,065 | Ashton | Apr. 20, 1948 |
| 2,450,031 | Berger | Sept. 28, 1948 |
| 2,492,014 | Spalding et al. | Dec. 20, 1949 |

FOREIGN PATENTS

| Number | Country | Date |
|---|---|---|
| 683,936 | Germany | Nov. 18, 1939 |